US012556867B2

(12) United States Patent
Lee et al.

(10) Patent No.: US 12,556,867 B2
(45) Date of Patent: Feb. 17, 2026

(54) SPEAKER UNIT FOR EARPHONE

(71) Applicant: ALMUS Corp., Chungcheongnam-do (KR)

(72) Inventors: Jong Won Lee, Incheon (KR); Yun Uk Ha, Incheon (KR); Jeong Kwon Park, Gyeonggi-do (KR); Soon Hyuk Hong, Gyeonggi-do (KR); Ji Wook Choi, Gyeonggi-do (KR)

(73) Assignee: ALMUS Corp., Chungcheongnam-do (KR)

( * ) Notice: Subject to any disclaimer, the term of this patent is extended or adjusted under 35 U.S.C. 154(b) by 135 days.

(21) Appl. No.: 18/629,261

(22) Filed: Apr. 8, 2024

(65) Prior Publication Data

US 2024/0348983 A1 Oct. 17, 2024

(30) Foreign Application Priority Data

Apr. 11, 2023 (KR) ........................ 10-2023-0047437

(51) Int. Cl.
*H04R 1/24* (2006.01)
*H04R 7/18* (2006.01)
(Continued)

(52) U.S. Cl.
CPC ............... *H04R 9/045* (2013.01); *H04R 7/18* (2013.01); *H04R 9/06* (2013.01); *H04R 1/24* (2013.01)

(58) Field of Classification Search
CPC . H04R 1/24; H04R 9/02; H04R 9/025; H04R 9/04; H04R 9/045; H04R 9/063; H04R 2209/026
See application file for complete search history.

(56) References Cited

U.S. PATENT DOCUMENTS 8,189,847 B2 * 5/2012 Huang ..................... H04R 1/24 381/345
8,774,447 B2 * 7/2014 Ko ........................... H04R 9/06 381/396

(Continued)

FOREIGN PATENT DOCUMENTS

CN 114866912 A * 8/2022 ............. H04R 9/027
KR 100519637 B1 * 10/2005 ............... H04R 1/24

(Continued)

OTHER PUBLICATIONS

Office Action from corresponding Korean Patent Application No. 10-2023-0047437, dated Oct. 16, 2024.

*Primary Examiner* — Ryan Robinson
(74) *Attorney, Agent, or Firm* — Harness, Dickey & Pierce, P.L.C.

(57) ABSTRACT

A speaker unit for an earphone includes a frame including an internal accommodation space; a low-frequency diaphragm; a low-frequency voice coil of a tubular structure connected to the low-frequency diaphragm; a center magnet disposed at the center of the low-frequency voice coil; a first ring-shaped magnet disposed between the center magnet and the low-frequency voice coil; a second ring-shaped magnet disposed on an outer side of the low-frequency voice coil; a high-frequency voice coil disposed on an outer side of the center magnet and including a tubular structure; a flexible substrate disposed on an outer side of the high-frequency voice coil; a coil fixing plate having a plate-shaped structure with one side being coupled to the high-frequency voice coil and another side being coupled to the flexible substrate; and a high-frequency diaphragm disposed above the coil fixing plate and configured to vibrate.

12 Claims, 12 Drawing Sheets

(51) Int. Cl.
*H04R 9/04* (2006.01)
*H04R 9/06* (2006.01)

(56) References Cited

U.S. PATENT DOCUMENTS

| | | | | |
|---|---|---|---|---|
| 11,290,825 | B1 * | 3/2022 | Ko | H04R 9/06 |
| 2009/0279729 | A1 * | 11/2009 | Huang | H04R 1/1016 381/345 |
| 2024/0073611 | A1 * | 2/2024 | Ren | H04R 9/025 |
| 2024/0348981 | A1 * | 10/2024 | Yang | H04R 9/045 |

FOREIGN PATENT DOCUMENTS

| | | | |
|---|---|---|---|
| KR | 10-2021-0018657 | A | 2/2021 |
| KR | 10-2389509 | B1 | 4/2022 |
| KR | 10-2022-0092663 | A | 7/2022 |

* cited by examiner

SPEAKER UNIT FOR EARPHONE

CROSS-REFERENCE TO RELATED APPLICATION

This application claims priority to Korean Patent Application No. 10-2023-0047437 filed on Apr. 11, 2023 in the Korean Intellectual Property Office, and all the benefits accruing therefrom under 35 U.S.C. 119, the contents of which in its entirety are herein incorporated by reference.

FIELD

The present disclosure relates to a speaker unit for an earphone.

BACKGROUND

An earphone includes a speaker unit that generates sound waves inside a housing.

The speaker unit may include a diaphragm, a magnet, a coil, and a plate. When current is applied to the coil, the coil becomes magnetic, and through the electrical interaction between the coil and the plate, the coil moves, causing the diaphragm to move. Such speaker units include a configuration for reproducing low-frequency sound and a configuration for reproducing high-frequency sound together (two-way type).

FIG. 1 is a diagram illustrating a conventional two-way speaker unit. Referring to FIG. 1, in the case of a conventional speaker (tweeter) that reproduces high-frequency sound, the thermal fusion pad, i.e., the substrate pad, of a flexible substrate electrically connected to the high-frequency voice coil is located on the outer side of the high-frequency diaphragm. Therefore, the size of the high-frequency diaphragm is limited, resulting in limitations in reproducing high-frequency sound.

SUMMARY

An object of the present invention is to provide a speaker unit for an earphone, wherein a substrate pad of a flexible substrate in a two-way speaker is positioned below a high-frequency diaphragm, thereby allowing expansion of the area of the high-frequency diaphragm.

The objects to be achieved by the present invention is not limited to the foregoing objective, and additional objectives, which are not mentioned herein, will be readily understood by those skilled in the art from the following description.

In one general aspect, a speaker unit for an earphone includes a frame including an internal accommodation space; a low-frequency diaphragm disposed below the frame and configured to vibrate; a low-frequency voice coil of a tubular structure connected to the low-frequency diaphragm and moving up and down; a center magnet disposed at the center of the low-frequency voice coil; a first ring-shaped magnet disposed between the center magnet and the low-frequency voice coil; a second ring-shaped magnet disposed on an outer side of the low-frequency voice coil; a high-frequency voice coil disposed on an outer side of the center magnet and including a tubular structure; a flexible substrate disposed on an outer side of the high-frequency voice coil; a coil fixing plate having a plate-shaped structure with one side being coupled to the high-frequency voice coil and another side being coupled to the flexible substrate; and a high-frequency diaphragm disposed above the coil fixing plate and configured to vibrate by being coupled to the one side and the other side of the coil fixing plate.

The coil fixing plate may include a side fixing portion including a ring-shaped structure around a perimeter thereof; a center fixing portion centrally disposed within the side fixing portion and including a plate-shaped structure smaller than the side fixing portion; at least two connection bridges disposed between the side fixing portion and the center fixing portion and each having one side coupled to the side fixing portion and an opposite side coupled to the center fixing portion; and a space portion configured to form an open passage for an area between the side fixing portion and the center fixing portion excluding the connection bridges.

The side fixing portion may have a lower surface coupled to the flexible substrate and an upper surface coupled to the high-frequency diaphragm.

The center fixing portion may have a lower surface coupled to an opposite end of the high-frequency voice coil and an upper surface coupled to the high-frequency diaphragm.

The center fixing portion may be in close contact with the high-frequency diaphragm.

The center fixing portion may include a ring structure with a central hole formed in a central area of the plate-shaped structure.

Each of the connection bridges may be in close contact with the high-frequency diaphragm.

Each of the connection bridges may be spaced apart from a lower part of the high-frequency diaphragm.

Each of the connection bridges may be formed with a curved structure such that a side height on one side is different from a side height on the other side.

In each of the connection bridges, a side height at an inflection point of the curved structure may be lower than or equal to a side height of the high-frequency voice coil, or the side height at the inflection point may be higher than the side height of the high-frequency voice coil.

The space portion may provide an accommodation space that accommodates a substrate pad for coupling a power line connected to the high-frequency voice coil to the flexible substrate.

The coil fixing plate may contain at least one or more of a plastic film material including polyethylene naphthalate (PEN) or polyetheretherketone (PEEK), an elastomer material including thermoplastic polyurethane elastomer (TPU), a rubber material, an aluminum material, an alloy material, or a graphene material.

Effects of the Invention

According to the present invention, by including a structure that allows the size of the high-frequency diaphragm to expand to a size comparable to the frame of the earphone speaker unit, it is possible to minimize the loss of low-frequency sound while enhancing high-frequency sound due to the expansion of the area of the high-frequency diaphragm.

In particular, it is possible to achieve hi-resolution audio for an earphone speaker since it is possible to increase sound pressure in the frequency bands of 10 kHz and above, which was difficult to achieve with conventional small speakers for earphones.

In addition, by providing the coil fixing plate with a space portion while arranging the space portion at a position where a power line passes over the top of a substrate pad of the flexible substrate, it enables an automated process during heat bonding between the high-frequency voice coil and the flexible substrate.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Objects, features and advantages of the present invention will become readily apparent by reference to the following detailed description when considered in conjunction with the accompanying drawings. Also, terms or words used herein should not be construed as having common or dictionary meanings, but should be construed as having meanings and concepts that comply with the technical spirit of the present invention on the basis of the principle that the inventor may appropriately define the concepts of the terms in order to best describe his or her invention. In addition, descriptions and details of well-known features and techniques may be omitted to avoid unnecessarily obscuring the discussion of the described embodiments of the invention.

Hereinafter, a speaker unit for an earphone according to an embodiment will be described in detail with reference to the accompanying drawings.

Figure 1:
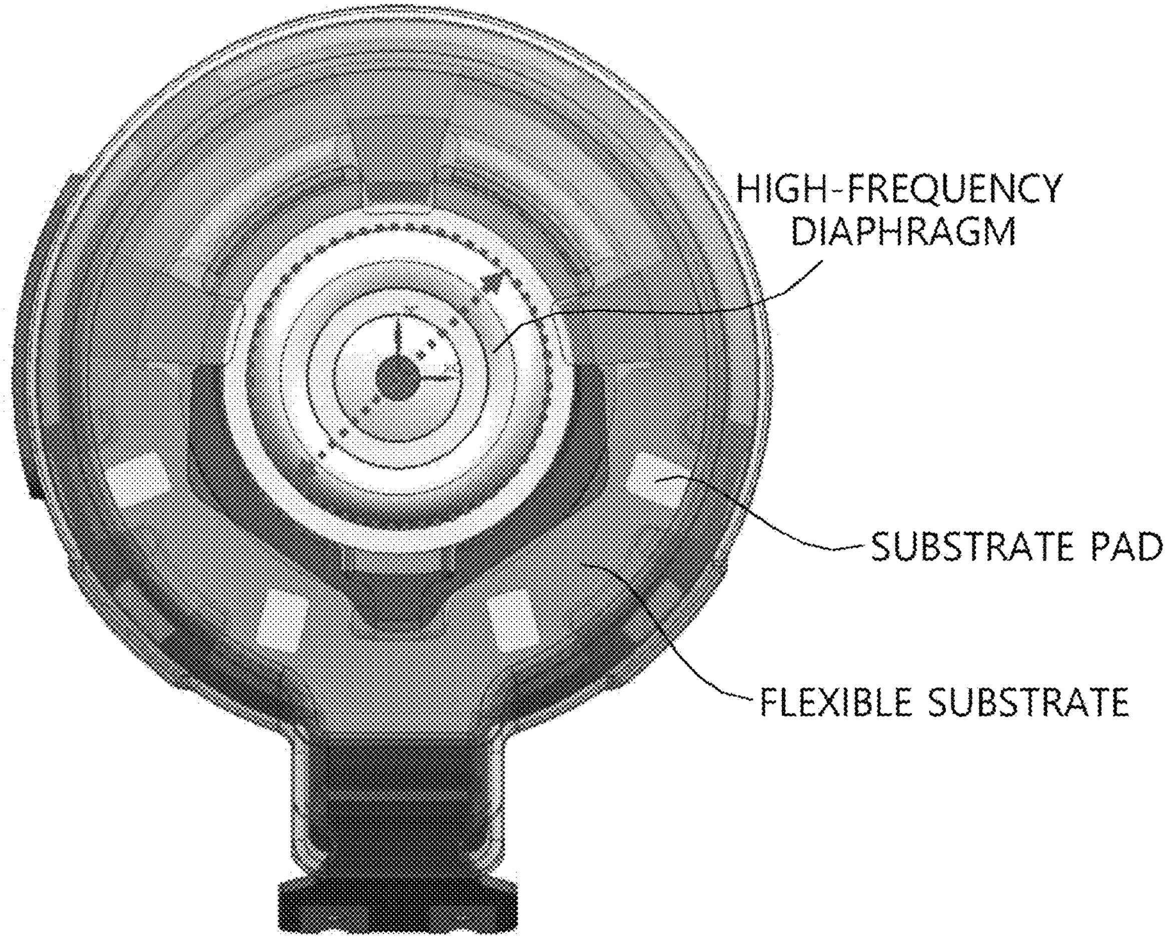
FIG. 1 is a diagram illustrating a conventional two-way speaker unit.
Figure 2:
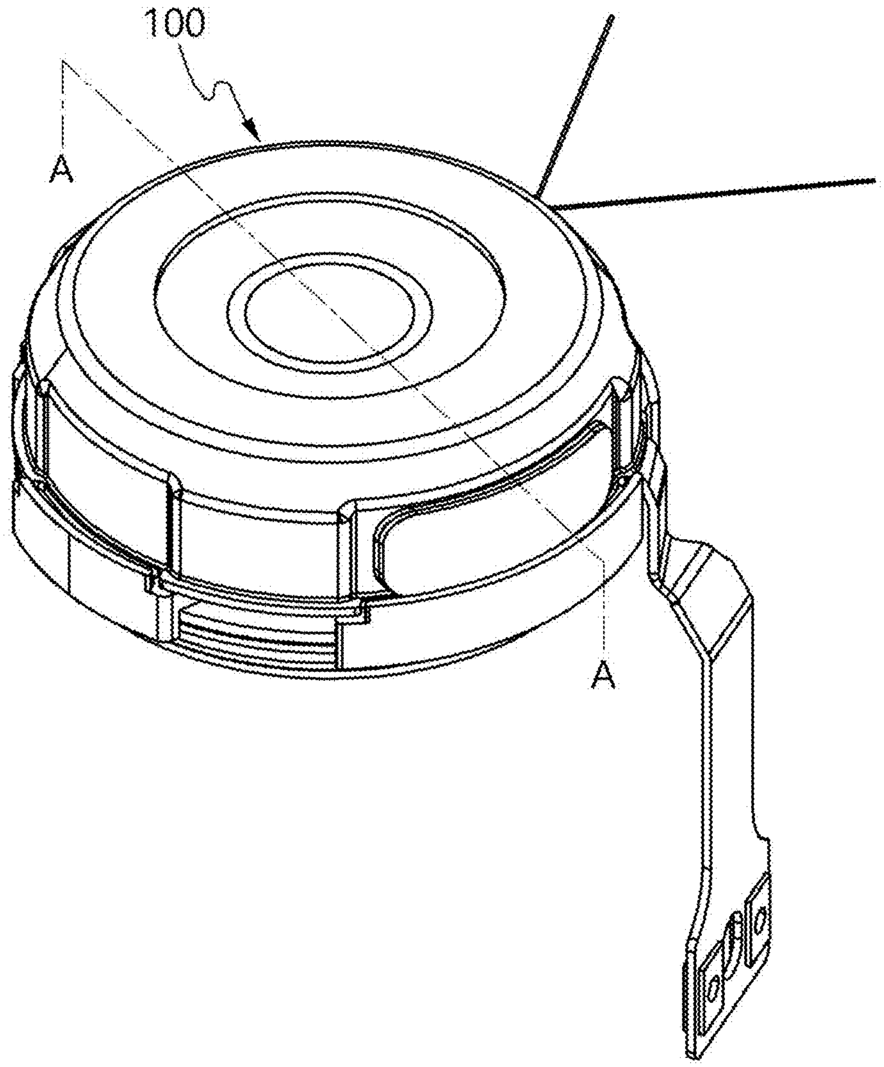
FIG. 2 is a perspective view of a speaker unit 100 for an earphone according to an embodiment of the present invention.
Figure 3:
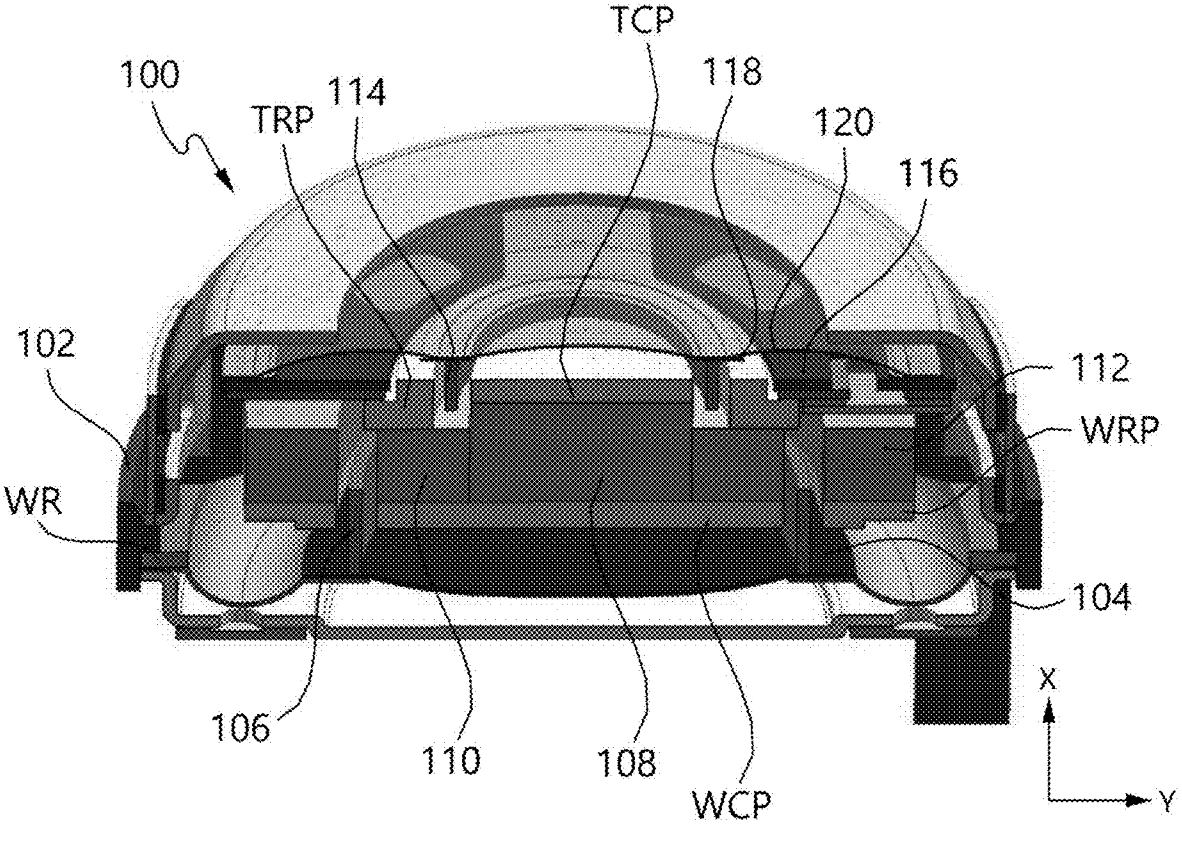
FIG. 3 is a cross-sectional view of the speaker unit 100 for an earphone, taken along line AA in FIG. 2.

FIG. 2 is a perspective view of a speaker unit 100 for an earphone according to an embodiment of the present invention, and FIG. 3 is a cross-sectional view of the speaker unit 100 for an earphone, taken along line AA in FIG. 2.

Hereinafter, in the drawings, an x-axis represents the up-down direction of the speaker unit 100 for an earphone, and a y-axis signifies the radial direction of the speaker unit 100 for an earphone. The upward direction is the direction in which sound is emitted by a high-frequency diaphragm and a low-frequency diaphragm. In other words, the speaker unit 100 for an earphone of the present invention includes a configuration for reproducing low-frequency sound and a configuration for reproducing high-frequency sound together (a two-way type).

Referring to FIGS. 2 and 3, in one embodiment, the speaker unit 100 for an earphone includes a frame 102, a low-frequency diaphragm 104, a low-frequency voice coil 106, a center magnet 108, a first ring-shaped magnet 110, a second ring-shaped magnet 112, a high-frequency voice coil 114, a flexible substrate 116, a coil fixing plate 118, and a high-frequency diaphragm 120.

The frame 102 is a housing member of the speaker unit 100 for an earphone and has an internal accommodation space. For example, the frame 102 may be a centrally open tubular structure.

The low-frequency diaphragm 104 generates sound by vibrating according to the movement of the low-frequency voice coil 106. The low-frequency diaphragm 104 may be fixed to a low-frequency fixing ring WR. The low-frequency fixing ring WR may be secured to the frame 102. The low-frequency diaphragm 104 may be provided to reproduce sound in the low-frequency range. The low-frequency diaphragm 104 emits sound in the downward direction in the drawing.

The low-frequency voice coil 106 is a coil that performs electromagnetic interaction between the first ring-shaped magnet 110 and the second ring-shaped magnet 112. For this purpose, the low-frequency voice coil 106 may have a tubular coil structure (e.g., a cylindrical coil structure), and one end of the tubular coil is fixed to the low-frequency diaphragm 104. This low-frequency voice coil 106 may be provided to reproduce sound in the low-frequency range.

The low-frequency voice coil 106 may be positioned between the first ring-shaped magnet 110 and the second ring-shaped magnet 112 along the y-axis (radial direction). That is, a portion of the low-frequency voice coil 106 is disposed to overlap with the first ring-shaped magnet 110 and the second ring-shaped magnet 112 in the radial direction. Accordingly, when current is applied to the low-frequency voice coil 106 to induce magnetism, the low-frequency voice coil 106 moves according to its magnetic polarity, causing the low-frequency diaphragm 104 fixed to the low-frequency voice coil 106 to move as well.

The center magnet 108 is a columnar magnetic body. Here, the columnar shape may be cylindrical or polygonal. The center magnet 108 is disposed inside the first ring-shaped magnet 110. With respect to the radial direction y of the earphone, the center magnet 108 may be located innermost, the second ring-shaped magnet 112 is positioned outermost, and the first ring-shaped magnet 110 may be positioned between the center magnet 108 and the second ring-shaped magnet 112. The outer peripheral surface of the center magnet 108 may be disposed in close contact with the inner peripheral surface of the first ring-shaped magnet 110. While the first ring-shaped magnet 110 is for reproducing sound in the low frequency range together with the second ring-shaped magnet 112, the center magnet 108 is for reproducing sound in the high frequency range together with the first ring-shaped magnet 110.

The structure of the center magnet 108 corresponds to a columnar magnetic body, which can increase the magnetic strength compared to a cylindrical structure, thereby enhancing the performance of the sound pressure output through the high-frequency diaphragm 120.

The first ring-shaped magnet 110 is a ring-shaped magnetic body with a hollow center portion. The first ring-shaped magnet 110 may be disposed in close contact with the outer peripheral surface of the center magnet 108. Additionally, the first ring-shaped magnet 110 may be positioned inside the second ring-shaped magnet 112. The outer surface of the first ring-shaped magnet 110, which is the ring-shaped magnetic body, is positioned at a predetermined distance from the inner surface of the second ring-shaped magnet 112. The low-frequency voice coil 106 may be positioned between the first ring-shaped magnet 110 and the second ring-shaped magnet 112 which are spaced apart from each other. Consequently, the first ring-shaped magnet 110 electromagnetically interacts with the low-frequency voice coil 106.

A low-frequency central plate WCP may be positioned between the center magnet 108 and the first ring-shaped magnet 110 and the low-frequency diaphragm 104. The low-frequency central plate WCP makes contact with one surface of the center magnet 108 and one surface of the first ring-shaped magnet 110 to form a magnetic field. The low-frequency central plate WCP may be a disk-shaped plate with a size corresponding to the size of the ring-shaped magnetic body of the first ring-shaped magnet 110.

In addition, a low-frequency ring plate WRP in contact with one surface of the second ring-shaped magnet 112 may be provided. The low-frequency ring plate WRP makes contact with the second ring-shaped magnet 112 to form a magnetic field. The low-frequency ring plate WRP may be a ring-shaped plate having the inner radius corresponding to the inner radius of the second ring-shaped magnet 112 and the outer radius equal to or smaller than the outer radius of the second ring-shaped magnet 112. Magnetic flux travels through the space between the low-frequency central plate WCP and the low-frequency ring plate WRP.

The high-frequency voice coil 114 is a coil that performs electromagnetic interaction between the center magnet 108 and the first ring-shaped magnet 110 for reproducing sound in the high frequency range. For this purpose, the high-frequency voice coil 114 may have a tubular coil structure (e.g., a cylindrical coil structure).

One end of the high-frequency voice coil 114 is coupled to the coil fixing plate 118 and the high-frequency diaphragm 120. Additionally, a high-frequency ring plate TRP is positioned on the outer side of the high-frequency voice coil 114 in the radial direction y, and a high-frequency central plate TCP is coupled to the center magnet 108 and positioned on the inner side of the high-frequency voice coil 114 in the radial direction y. That is, a portion of the high-frequency voice coil 114 is disposed to overlap with the high-frequency ring plate TRP and the high-frequency central plate TCP in the radial direction.

Accordingly, when current is applied to the high-frequency voice coil 114 to induce magnetism, the high-frequency voice coil 114 moves according to its magnetic polarity, causing the high-frequency diaphragm 120 fixed to the high-frequency voice coil 114 to move as well.

The flexible substrate 116 supplies an electrical signal to the low-frequency voice coil 106 and the high-frequency voice coil 114. The flexible substrate 116 may be positioned at a distance along the outer peripheral surface of the high-frequency ring plate TRP. The flexible substrate 116 may be made of a flexible material.

Figure 4:
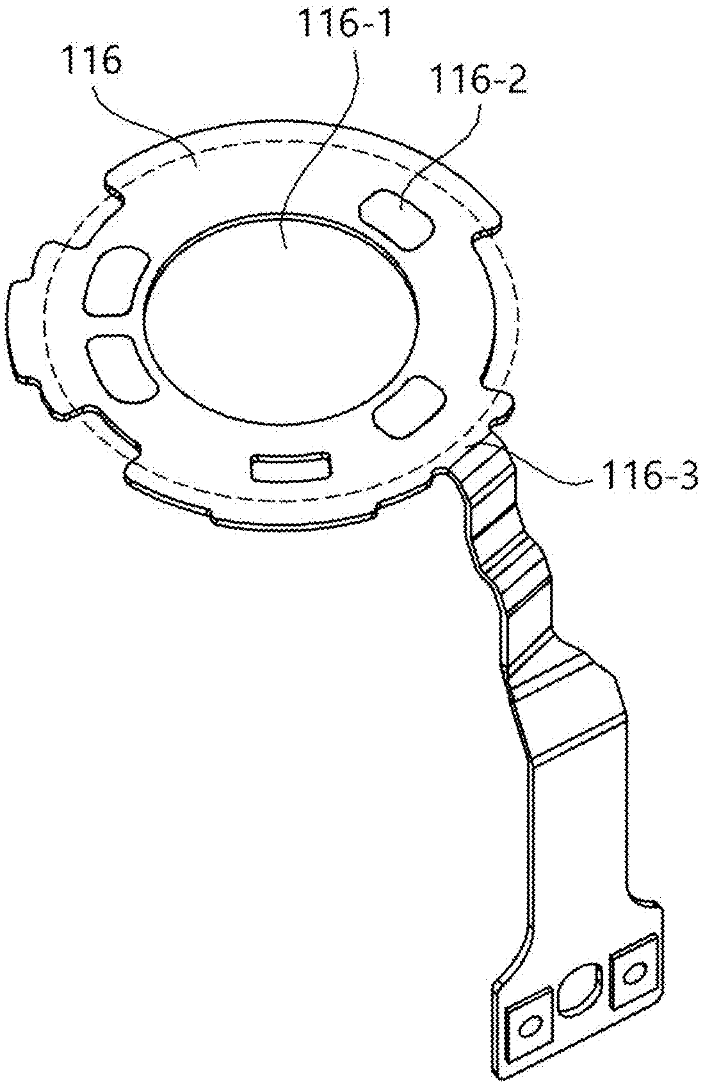
FIG. 4 is a reference view of a flexible substrate 116 according to an embodiment.

FIG. 4 is a reference view of a flexible substrate 116 according to an embodiment.

As shown in FIG. 4, the flexible substrate 116 has a hollow portion 116-1 formed in the central part thereof. The hollow portion 116-1 of the flexible substrate 116 may accommodate the high-frequency ring plate TRP, the high-frequency voice coil 114, the high-frequency central plate TCP, and the like.

In addition, a plurality of substrate pads 116-2 are formed on the upper surface of the flexible substrate 116. The substrate pads 116-2 are pads for attaching and fixing a power line (not shown) to supply an electrical signal to the low-frequency voice coil 106 and the high-frequency voice coil 114. The power line is connected to the low-frequency voice coil 106 and the high-frequency voice coil 114 while being attached to the substrate pads 116-2 by heat bonding or the like. Moreover, one side of the coil fixing plate 118 may be coupled to a peripheral portion 116-3 (indicated by a dotted line) of the upper surface of the flexible substrate 116.

The coil fixing plate 118 is a member for fixing the high-frequency voice coil 114. To this end, the coil fixing plate 118 includes a plate-shaped structure with one side being coupled to one end of the high-frequency voice coil 114 and another side being coupled to one surface of the flexible substrate 116.

The coil fixing plate 118 may be made of a plastic film material including polyethylene naphthalate (PEN) or polyetheretherketone (PEEK), an elastomer material including thermoplastic polyurethane elastomer (TPU), a rubber material, an aluminum material, an alloy material, or a graphene material.

Figure 5:
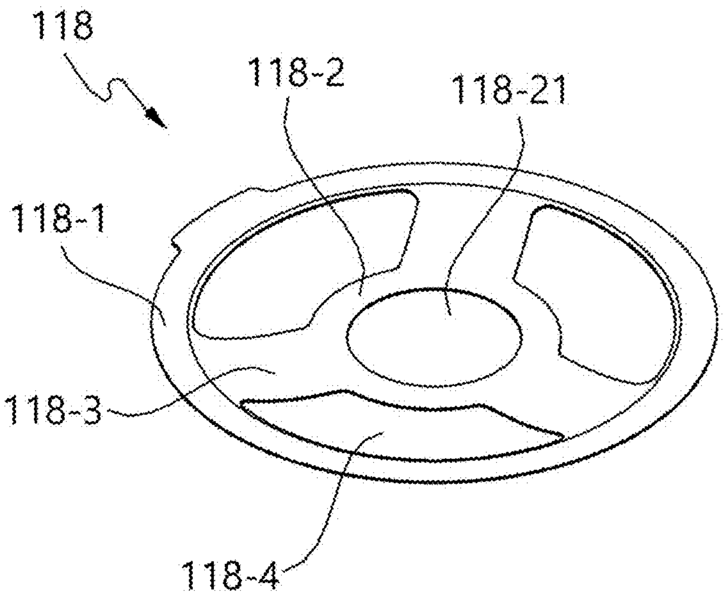
FIG. 5 is a reference view of a coil fixing plate 118 according to an embodiment.
Figure 6:
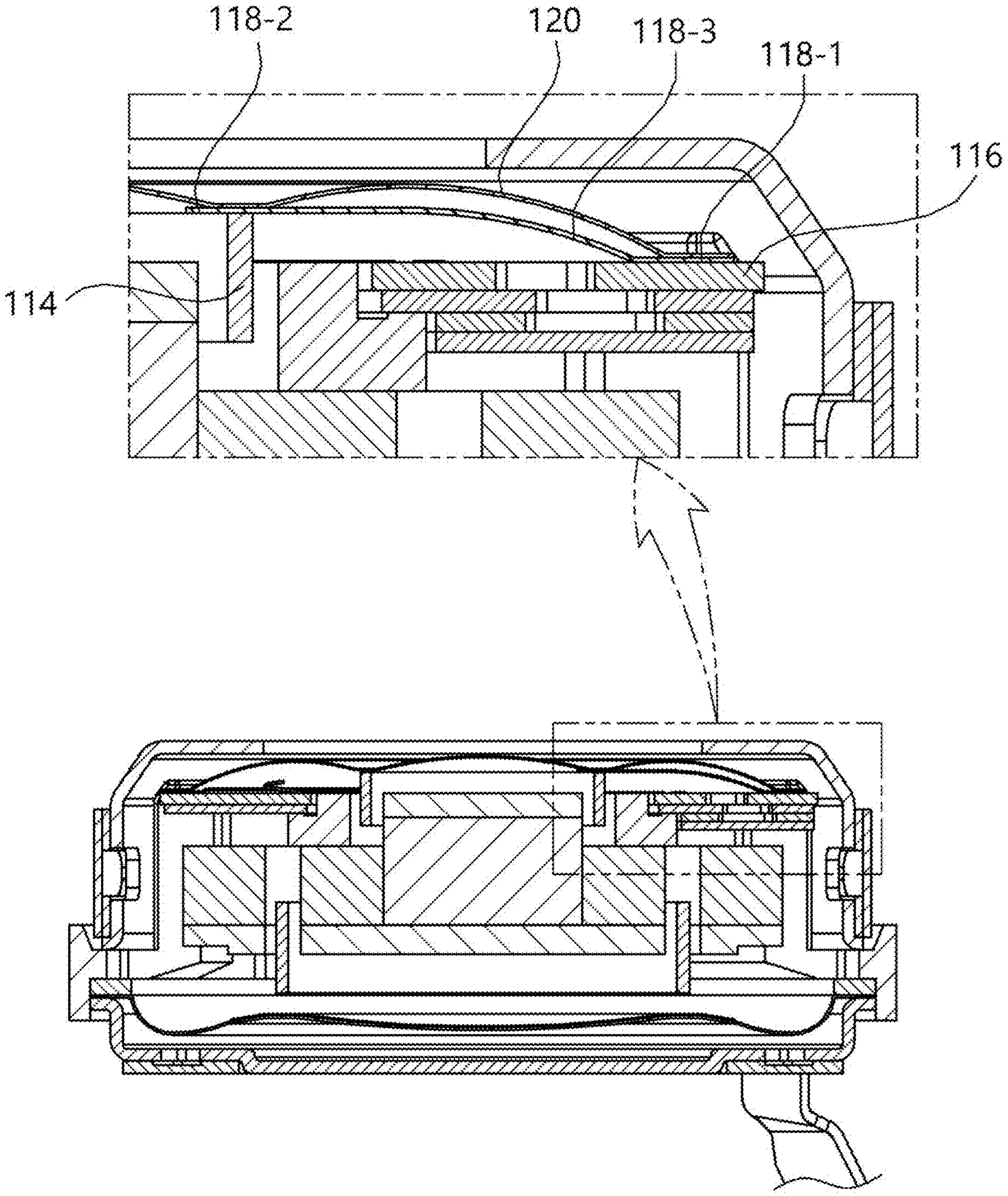
FIG. 6 is a partially enlarged cross-sectional view of a speaker unit for an earphone including the coil fixing plate 118 according to the embodiment.

FIG. 5 is a reference view of a coil fixing plate 118 according to an embodiment, and FIG. 6 is a partially enlarged cross-sectional view of a speaker unit for an earphone including the coil fixing plate 118 according to the embodiment.

Referring to FIG. 5, the coil fixing plate 118 includes a side fixing portion 118-1, a center fixing portion 118-2, connection bridges 118-3, and space portion 118-4.

The side fixing portion 118-1 may have a ring-shaped structure around its perimeter. Referring to FIG. 6, the lower surface of the side fixing portion 118-1 is coupled or adhered to the flexible substrate 116 and the upper surface is coupled or adhered to one end of the high-frequency vibrating plate 120.

The center fixing portion 118-2 is centrally disposed within the side fixing portion 118-1 and includes a plate-shaped structure smaller than the side fixing portion 118-1.

Referring to FIG. 6, the lower surface of the center fixing portion 118-2 is coupled to an end of the high-frequency voice coil 114, and the upper surface of the center fixing portion 118-2 is coupled to the high-frequency diaphragm 120.

The center fixing portion 118-2 may have a ring-shaped structure smaller than the side fixing portion 118-1 or may have a plate-shaped structure. The center fixing portion 118-2 shown in FIG. 5 has a ring-shaped structure. As shown in FIG. 5, the center fixing portion 118-2 may include a ring structure with a central hole 118-21 formed in the center area of the plate-shaped structure.

However, the ring-shaped structure of the center fixing portion 118-2 is merely exemplary, and the center fixing portion 118-2 may have a plate-shaped structure such as a disc or polygonal plate, other than a ring-shaped structure.

Figure 7:
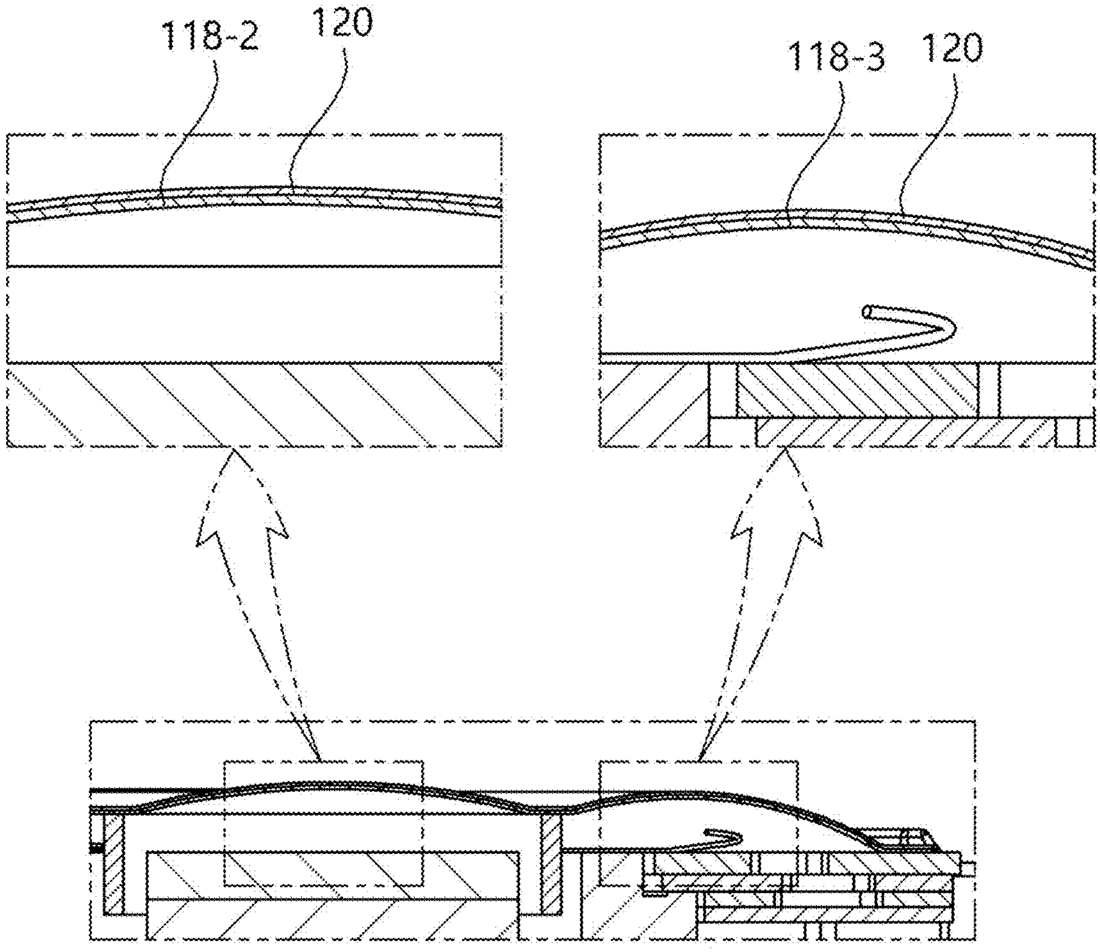
FIG. 7 is a partially enlarged cross-sectional view of a speaker unit for an earphone including a coil fixing plate 118 according to another embodiment.

FIG. 7 is a partially enlarged cross-sectional view of a speaker unit for an earphone including a coil fixing plate 118 according to another embodiment. Referring to FIG. 7, it shows a case where the center fixing portion 118-2 has a plate-shaped structure, and it can be seen that the center fixing portion 118-2 of the plate-shaped structure is in close contact with the high-frequency diaphragm 120. When the center fixing portion 118-2 has a plate-shaped structure, it may increase the rigidity of the high-frequency diaphragm 120.

The connection bridges 118-3 are positioned between the side fixing portion 118-1 and the center fixing portion 118-2. At least two connection bridges 118-3 may be formed.

As shown in FIG. 5, each connection bridge 118-3 is coupled on one side to the side fixing portion 118-1 and on the other side to the center fixing portion 118-2.

Each connection bridge 118-3 may be spaced apart from the lower part of the high-frequency diaphragm 120. Referring to FIG. 6, it can be seen that the connection bridges 118-3 are spaced apart from the lower part of the high-frequency diaphragm 120.

Additionally, each connection bridge 118-3 may be formed with a curved structure such that the side height on one side is different from the side height on the other side.

Figure 8:
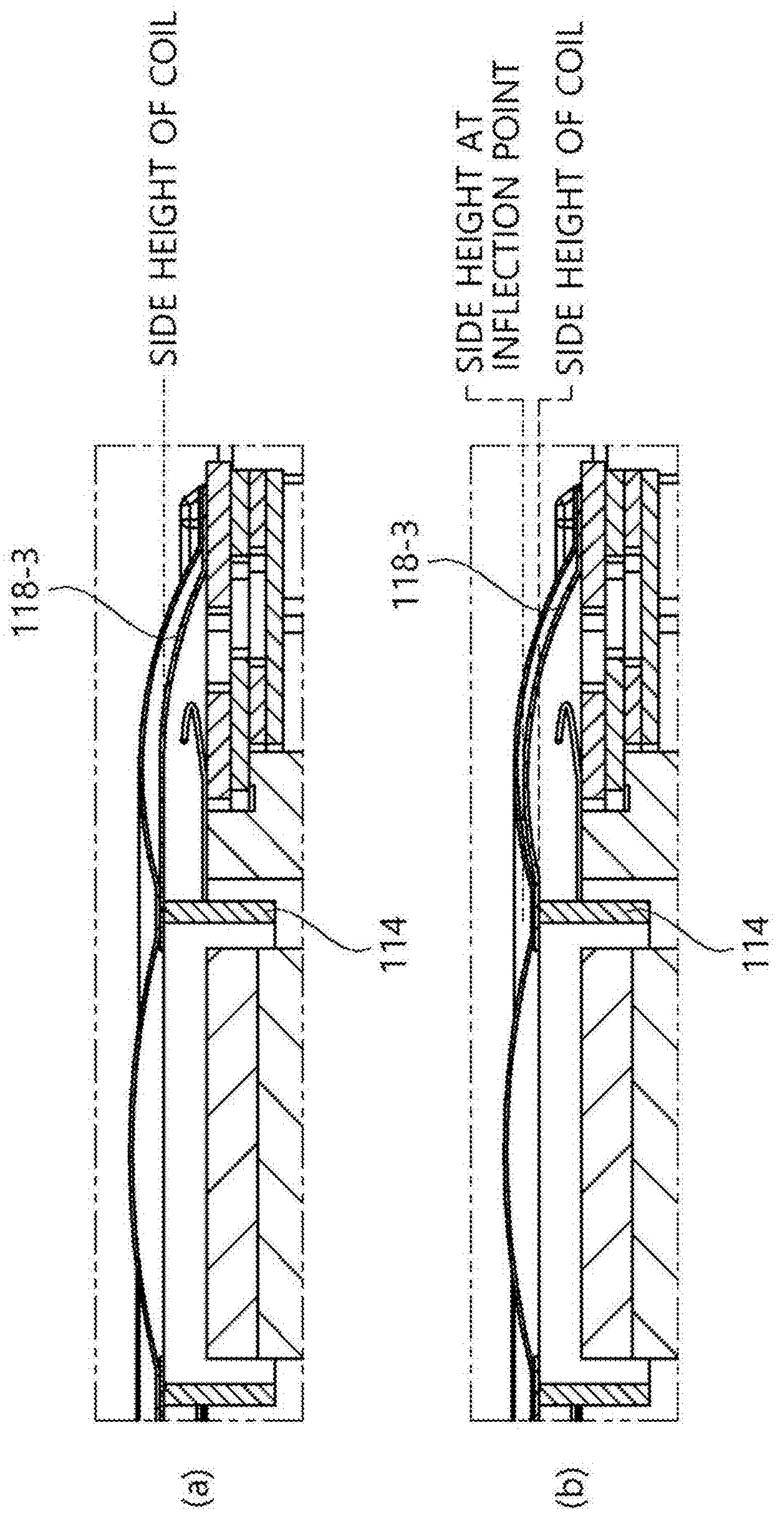
FIG. 8 shows reference views illustrating connection bridges 118-3 having various curved structures.

FIG. 8 shows reference views illustrating connection bridges 118-3 having various curved structures.

(a) of FIG. 8 illustrates an example in which the side height at the inflection point of the curved structure of the connection bridge 118-3 is lower than or equal to the side height of the high-frequency voice coil 114. In addition, (b) of FIG. 8 illustrates an example in which the side height at the inflection point of the curved structure of the connection bridge 118-3 is higher than the side height of the high-frequency voice coil 114.

By configuring the inflection point of the curved surface of the connecting bridge 118-3 to be higher or lower than the coil side height of the high-frequency voice coil 114 while ensuring a sufficient distance from the high-frequency diaphragm 120, contact between the connection bridge 118-3 and the high-frequency diaphragm 120 is prevented during the up and down motion of the high-frequency diaphragm 120.

Meanwhile, each connection bridge 118-3 may also be in close contact with the high-frequency diaphragm 120. Referring to FIG. 7, it can be confirmed that the connection bridge 118-3 is in close contact with the high-frequency diaphragm 120.

Since the connection bridge 118-3 is in close contact with the high-frequency diaphragm 120, noise generation due to contact with the connection bridge 118-3 may be suppressed even during vibration of the high-frequency diaphragm 120.

Figure 9:
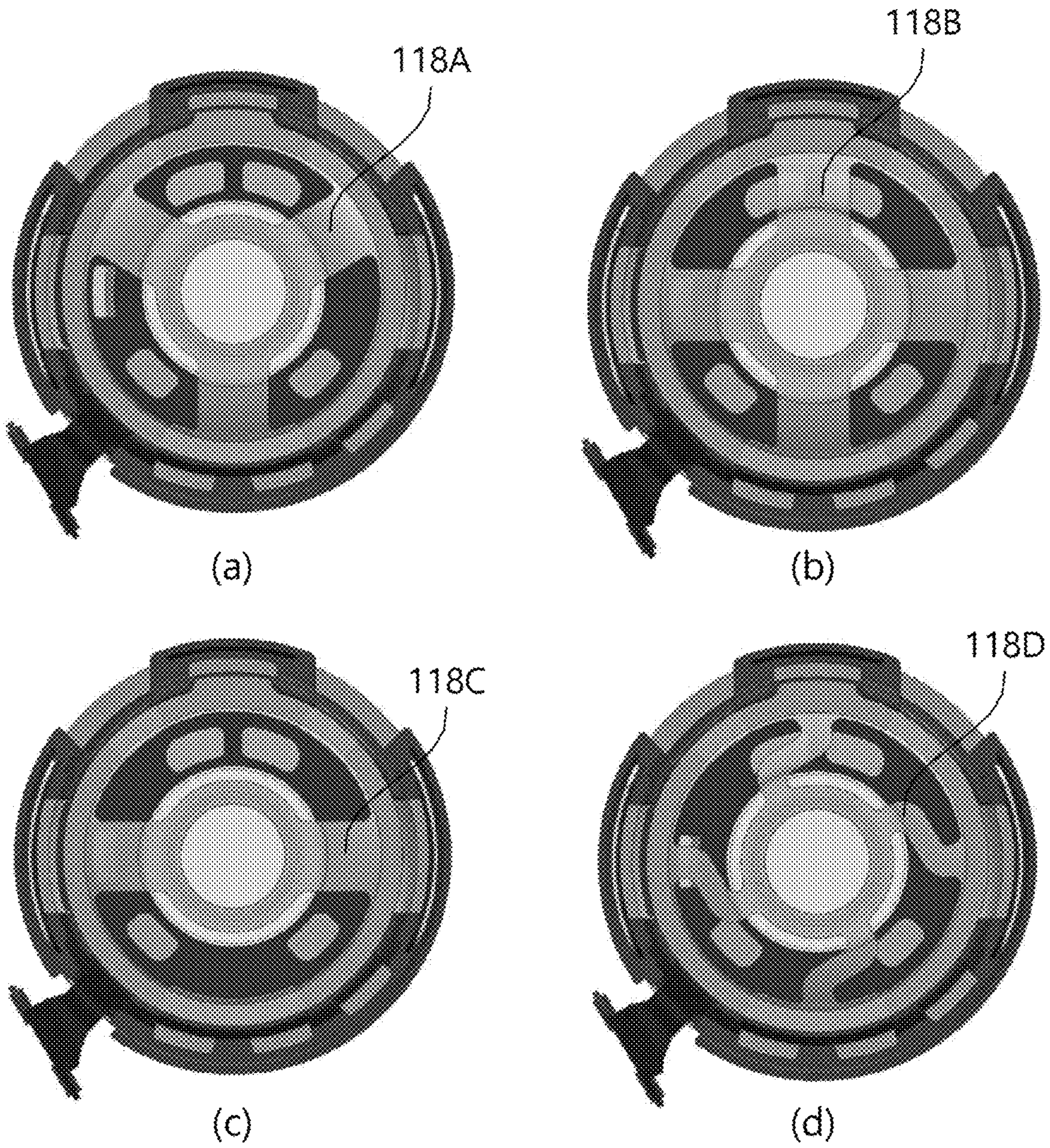
FIG. 9 shows reference views illustrating a coil fixing plate 118 having various numbers and shapes of connection bridges 118-3.

FIG. 9 shows reference views illustrating a coil fixing plate 118 having various numbers and shapes of connection bridges 118-3.

(a) of FIG. 9 illustrates a coil fixing plate 118A with three connection bridges 118-3, (b) illustrates a coil fixing plate 118B with four connection bridges 118-3, and (c) illustrates a coil fixing plate 118C with two connection bridges 118-3. In addition, (d) of FIG. 9 illustrates a coil fixing plate 118D with four connection bridges 118-3, where one end and the opposite end of each connection bridge 118-3, coupled, respectively, to the side fixing portion 118-1 and the center fixing portion 118-2, are each bent.

Since the rigidity, weight, etc., of the coil fixing plate 118 may affect the high-frequency sound quality, the number of connection bridges 118-3 may be adjusted to two or more, and the shape may also be designed as a straight line or a curved line.

The space portion 118-4 forms an open passage for the area between the side fixing portion 118-1 and the center fixing portion 118-2, excluding the connection bridges 118-3.

The space portion 118-4 provides an accommodation space that allows the power line connected to the high-frequency voice coil 114 to be attached and fixed to the substrate pads 116-2 of the flexible substrate 116.

Figure 10:
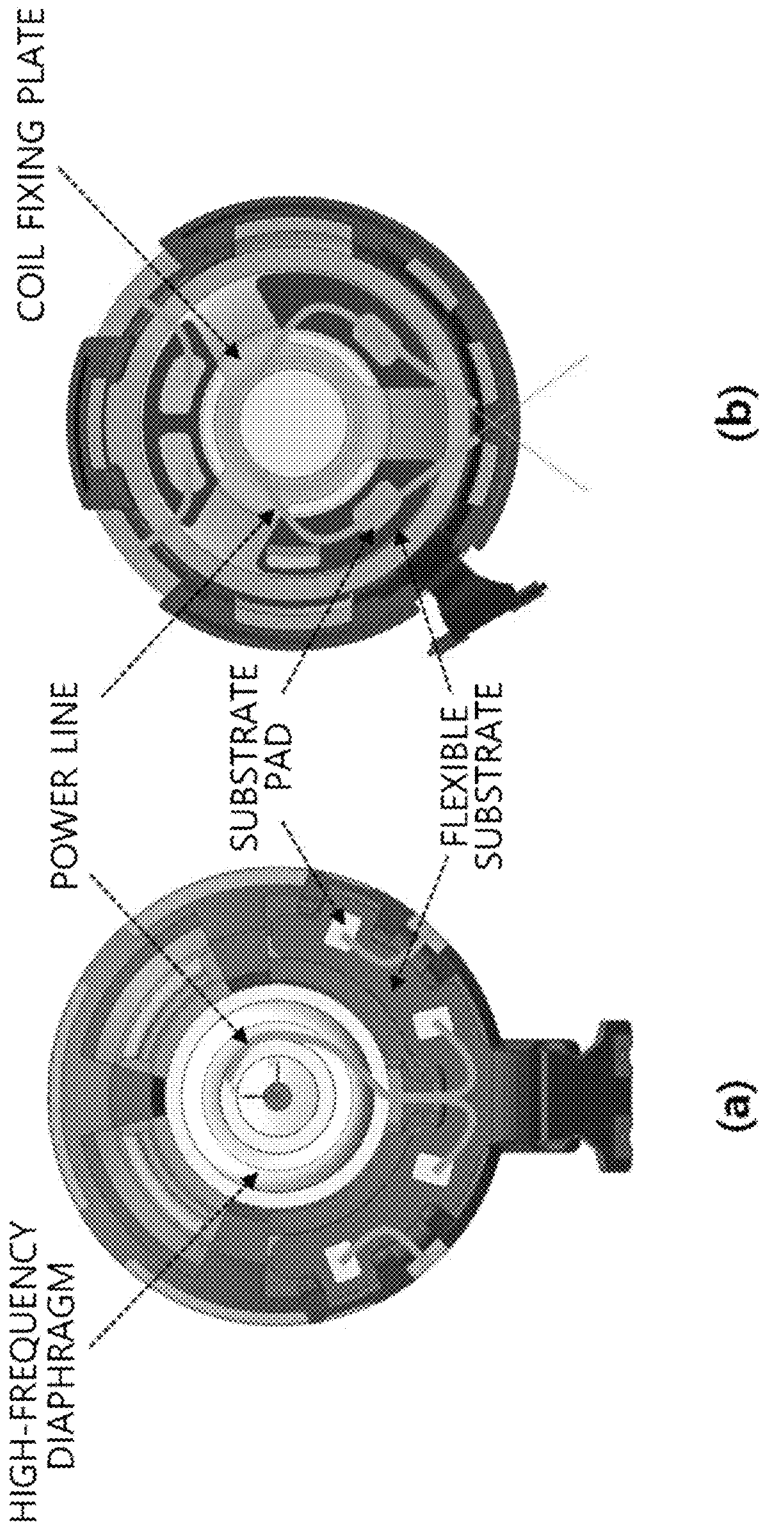
FIG. 10 shows reference views illustrating a state in which a power line of a speaker is adhered to a substrate pad 116-2 of a flexible substrate 116.

FIG. 10 shows reference views illustrating a state in which a power line of a speaker is adhered to a substrate pad 116-2 of a flexible substrate 116.

(a) of FIG. 10 shows the state where a power line is coupled to the substrate pads and the high-frequency diaphragm in a conventional speaker structure while (b) of FIG. 10 shows the state where a power line is coupled through the space portion 118-4 to the substrate pads 116-2 of the flexible substrate 116 according to the present invention.

In the conventional speaker structure, the high-frequency voice coil is bonded to the lower side of the high-frequency diaphragm, and the start and end lines of the power line are arranged in a straight line direction. However, in the present invention, the upper side of the high-frequency voice coil 114 is bonded to the lower surface of the center fixing portion 118-2 of the coil fixing plate 118, and the start and end lines of the power line are arranged horizontally, with the power line being coupled through the space portion 118-4 to the substrate pad 116-2 of the flexible substrate 116.

That is, the space portion 118-4 is formed on the coil fixing plate 118, and the connection bridges 118-3 are arranged to prevent interference between the coil fixing plate 118 and a heat bonding tip during the heat bonding process for connecting the power line of the high-frequency voice coil 114. As a result, after the coil fixing plate 118 is seated on the flexible substrate 116, it enables the heat bonding of the high-frequency voice coil 114 and the adhesion to the substrate pad 116-2.

That is, the power line is configured to pass through the top of the substrate pad 116-2 of the flexible substrate 116, wherein the space portion 118-4 is positioned above the substrate pad of the flexible substrate. This arrangement enables an automated process during the heat bonding between the high-frequency voice coil 114 and the flexible substrate 116.

The high-frequency diaphragm 120 is disposed above the coil fixing plate 118 and vibrates by being coupled to one side and another side of the coil fixing plate 118. The high-frequency diaphragm 120 generates sound by vibrating according to the movement of the high-frequency voice coil 114. The high-frequency diaphragm 120 is designed for reproducing sound in the high-frequency range and emits sound in the upward direction in the drawing. Such high-frequency diaphragm 120 may have a plate-shape structure (e.g., a disc-shaped plate).

As shown in FIG. 6, one side of the lower surface of the plate-shaped structure of the high-frequency diaphragm 120 is joined to the upper surface of the coil fixing plate 118. At this point, the joining position corresponds to the position where the coil fixing plate 118 joined to the high-frequency voice coil 114, that is, the center fixing portion 118-2. Additionally, an edge portion corresponding to the border of the plate-shaped structure of the high-frequency diaphragm 120 is joined to the upper surface of the side fixing portion 118-1 of the coil fixing plate 118.

The high-frequency diaphragm 120 is sufficiently large to encompass both the flexible substrate 116 and the coil fixing plate 118.

Figure 11:
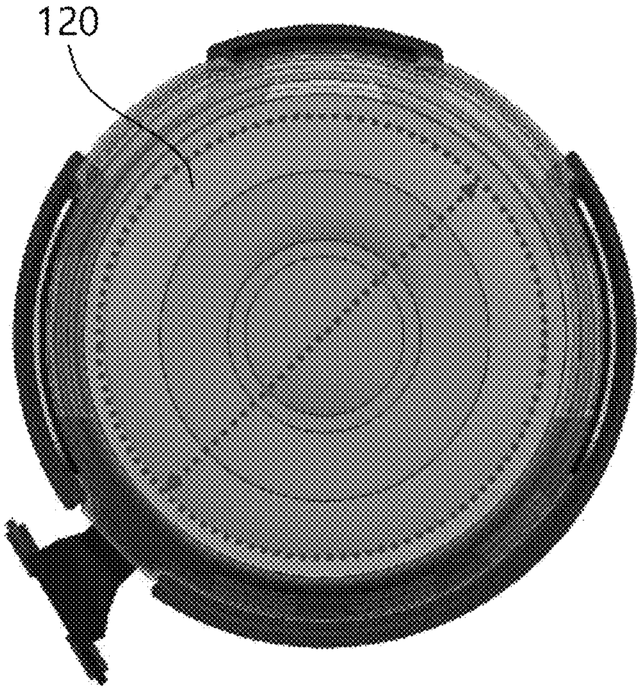
FIG. 11 is a plan view of a speaker unit for an earphone including a high-frequency diaphragm 120.

FIG. 11 is a plan view of a speaker unit for an earphone including a high-frequency diaphragm 120.

Referring to FIG. 11, unlike the traditional placement of the high-frequency diaphragm 120 inside the flexible substrate, the high-frequency diaphragm 120 is disposed above the flexible substrate, allowing for expansion of the size of the high-frequency diaphragm 120, as indicated by the arrows.

Figure 12:
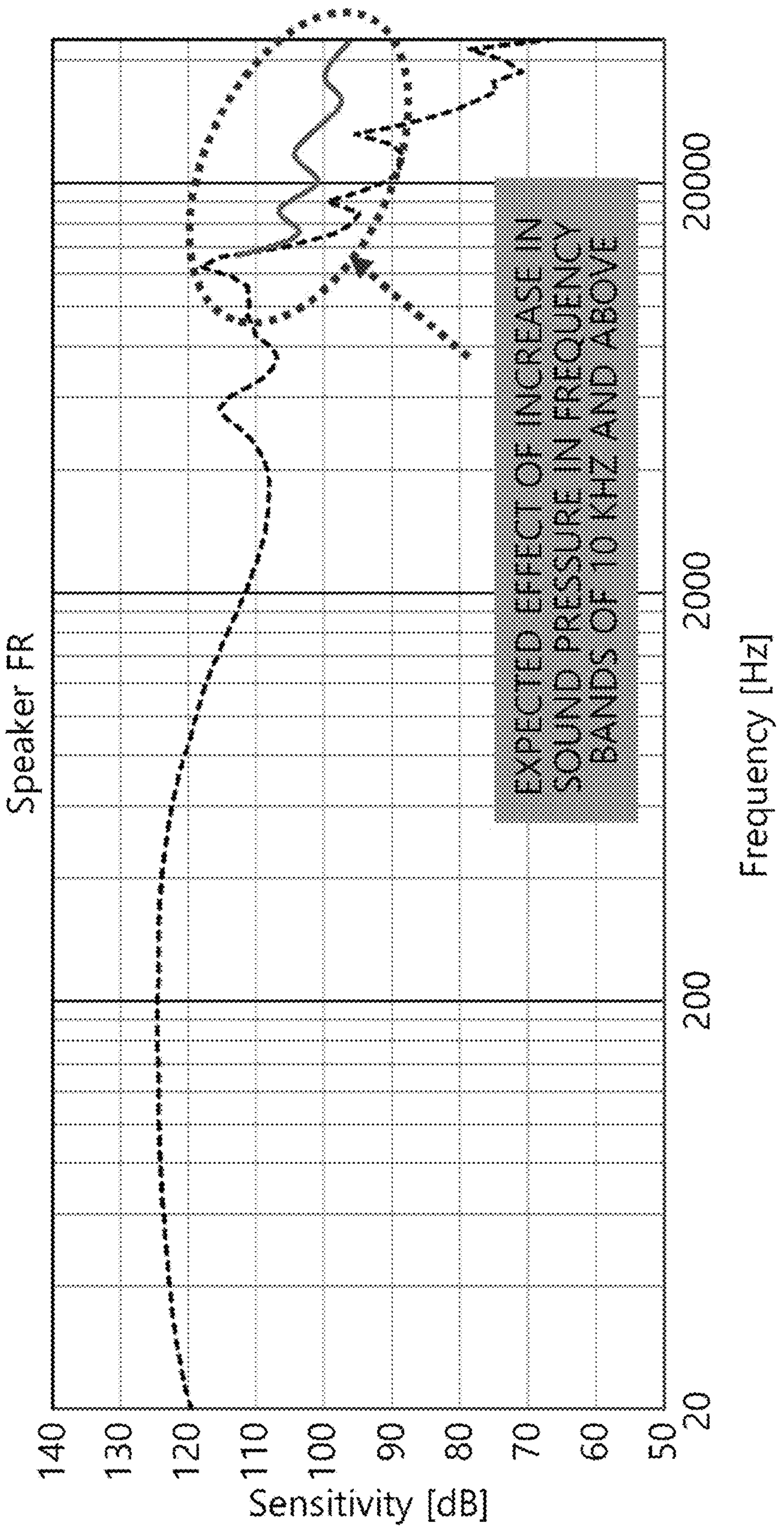
FIG. 12 is a graph for describing the effect of a speaker unit for an earphone according to the present invention.

FIG. 12 is a graph for describing the effect of a speaker unit for an earphone according to the present invention.

According to FIG. 12, the speaker unit for an earphone according to the present invention may expect improvement in high-frequency characteristics by expanding the size of the high-frequency diaphragm and applying a structure specialized to a magnetic field. In particular, the speaker unit for an earphone enables an increase in sound pressure in the frequency bands of 10 KHz and above, which was challenging to achieve with conventional small speakers for earphones.

In the acoustic structure of conventional two-way speakers, the size of the high-frequency diaphragm has been limited due to the placement of the substrate pad of the flexible substrate electrically connected to the high-frequency voice coil on the outer side of the high-frequency diaphragm. However, according to the present invention, as shown in FIG. 11, the size of the high-frequency vibrating plate can be expanded to a size comparable to the frame of the speaker unit for an earphone.

In addition, according to the present invention, the substrate pads are not exposed to the outer side of the high-frequency diaphragm, and a frame opening hole may be formed directly adjacent to the outer side of the high-frequency vibrating plate and may function as a passage for low-frequency sound to pass through. This structure makes it possible to minimize the loss of low-frequency sound while enhancing high-frequency sound due to the expansion of the area of the high-frequency diaphragm.

Therefore, the two-way speaker unit of the present invention may expect improvement in high-frequency characteristics by expanding the size of the high-frequency diaphragm and applying a specialized structure for a magnetic field.

In particular, the speaker unit for an earphone enables an increase in sound pressure in the frequency bands of 10 KHz and above, which was challenging to achieve with conventional small speakers for earphones.

It should be understood that the above-described embodiments of the present invention are provided only as examples in all aspects and are not limited. The scope of the present invention is defined according to the appended claims rather than the above detailed description. Additionally, the meaning and scope of the appended claims as well as all the modifications and modified forms that are drawn from the meaning and scope of the appended claims should be interpreted as being included in the scope of the present invention.

REFERENCE NUMERALS

100: SPEAKER UNIT FOR AN EARPHONE
102: FRAME
104: LOW-FREQUENCY DIAPHRAGM
106: LOW-FREQUENCY VOICE COIL
108: CENTER MAGNET
110: FIRST RING-SHAPED MAGNET
112: SECOND RING-SHAPED MAGNET
114: HIGH-FREQUENCY VOICE COIL
116: FLEXIBLE SUBSTRATE
118: COIL FIXING PLATE
120: HIGH-FREQUENCY DIAPHRAGM

What is claimed is:

1. A speaker unit for an earphone comprising:
- a frame comprising an internal accommodation space;
- a low-frequency diaphragm disposed below the frame and configured to vibrate;
- a low-frequency voice coil of a tubular structure connected to the low-frequency diaphragm and moving up and down;
- a center magnet disposed at a center of the low-frequency voice coil;
- a first ring-shaped magnet disposed between the center magnet and the low-frequency voice coil;
- a second ring-shaped magnet disposed on an outer side of the low-frequency voice coil;
- a high-frequency voice coil disposed on an outer side of the center magnet and having a tubular structure;
- a flexible substrate disposed on an outer side of the high-frequency voice coil;
- a coil fixing plate including a plate-shaped structure with one side being coupled to of the high-frequency voice coil and another side being coupled to the flexible substrate; and
- a high-frequency diaphragm disposed above the coil fixing plate and configured to vibrate by being coupled to the one side and the other side of the coil fixing plate.

2. The speaker unit of claim 1, wherein the coil fixing plate comprises
- a side fixing portion including a ring-shaped structure around a perimeter thereof;
- a center fixing portion centrally disposed within the side fixing portion and including a plate-shaped structure smaller than the side fixing portion;
- at least two connection bridges disposed between the side fixing portion and the center fixing portion and each having one side coupled to the side fixing portion and an opposite side coupled to the center fixing portion; and
- a space portion configured to form an open passage for an area between the side fixing portion and the center fixing portion excluding the connection bridges.

3. The speaker unit of claim 2, wherein the side fixing portion has a lower surface coupled to the flexible substrate and an upper surface coupled to the high-frequency diaphragm.

4. The speaker unit of claim 2, wherein the center fixing portion has a lower surface coupled to an opposite end of the high-frequency voice coil and an upper surface coupled to the high-frequency diaphragm.

5. The speaker unit of claim 2, wherein the center fixing portion is in close contact with the high-frequency diaphragm.

6. The speaker unit of claim 2, wherein the center fixing portion comprises a ring structure with a central hole formed in a central area of the plate-shaped structure.

7. The speaker unit of claim 2, wherein each of the connection bridges is in close contact with the high-frequency diaphragm.

8. The speaker unit of claim 2, wherein each of the connection bridges is spaced apart from a lower part of the high-frequency diaphragm.

9. The speaker unit of claim 8, wherein each of the connection bridges is formed with a curved structure such that a side height on one side is different from a side height on the other side.

10. The speaker unit of claim 9, wherein in each of the connection bridges, a side height at an inflection point of the curved structure is lower than or equal to a side height of the high-frequency voice coil, or the side height at the inflection point is higher than the side height of the high-frequency voice coil.

11. The speaker unit of claim 2, wherein the space portion provides an accommodation space that accommodates a substrate pad for coupling a power line connected to the high-frequency voice coil to the flexible substrate.

12. The speaker unit of claim 1, wherein the coil fixing plate contains at least one or more of a plastic film material including polyethylene naphthalate (PEN) or polyetheretherketone (PEEK), an elastomer material including thermoplastic polyurethane elastomer (TPU), a rubber material, an aluminum material, an alloy material, or a graphene material.

* * * * *